United States Patent
Nen et al.

(10) Patent No.: US 7,856,918 B2
(45) Date of Patent: Dec. 28, 2010

(54) PNEUMATIC BRAKE BOOSTER COMPRISING A FORCE SENSOR

(75) Inventors: Yannick Nen, Arpajon (FR); Olivier Bernadat, Le Perreux (FR); Bruno Beylerian, Louvres (FR); Omar Brahmi, Paris (FR)

(73) Assignee: Robert Bosch GmbH, Stuttgart (DE)

( * ) Notice: Subject to any disclaimer, the term of this patent is extended or adjusted under 35 U.S.C. 154(b) by 399 days.

(21) Appl. No.: 11/950,852

(22) Filed: Dec. 5, 2007

(65) Prior Publication Data

US 2008/0134874 A1     Jun. 12, 2008

(51) Int. Cl.
    *F15B 9/10*     (2006.01)
    *F01B 31/12*     (2006.01)
(52) U.S. Cl. .......................................... 91/376 R; 91/1
(58) Field of Classification Search ........................ 91/1, 91/376 R
See application file for complete search history.

(56) References Cited

U.S. PATENT DOCUMENTS 4,718,324 A     1/1988     Gautier et al.

6,805,037 B2 *     10/2004     Hoffmann et al. ................. 91/1

FOREIGN PATENT DOCUMENTS

| FR | 2736606 A1 | 1/1997 |
|---|---|---|
| FR | 2834265 A1 | 7/2003 |

* cited by examiner

*Primary Examiner*—F. Daniel Lopez
(74) *Attorney, Agent, or Firm*—Michael Best & Friedrich LLP

(57) ABSTRACT

A pneumatic brake booster 1 comprising: a sealed structure 3 comprising a rigid casing 11 forming a funnel 19 furnished with an opening and a movable wall 13 dividing the sealed structure 3 into a low-pressure chamber 25 and a working chamber 27, a pneumatic piston 5 comprising a boss 31 fixedly attached to the movable wall 13 and mounted so as to slide in the funnel opening, a valve element 33 housed in the boss 31 and a seal 35 positioned between the boss 31 and the funnel 19, an input rod 7 and an output rod 9 coupled on either side of the pneumatic piston 5, and a return spring 37 to return the pneumatic piston 5 to a rest position, the return spring 37 being placed in the low-pressure chamber 25 between an internal surface 45 of the rigid casing and the pneumatic piston 5, and a force sensor 39 placed in the low-pressure chamber 25 and subjected to the pressure variations of the return spring 37.

15 Claims, 2 Drawing Sheets

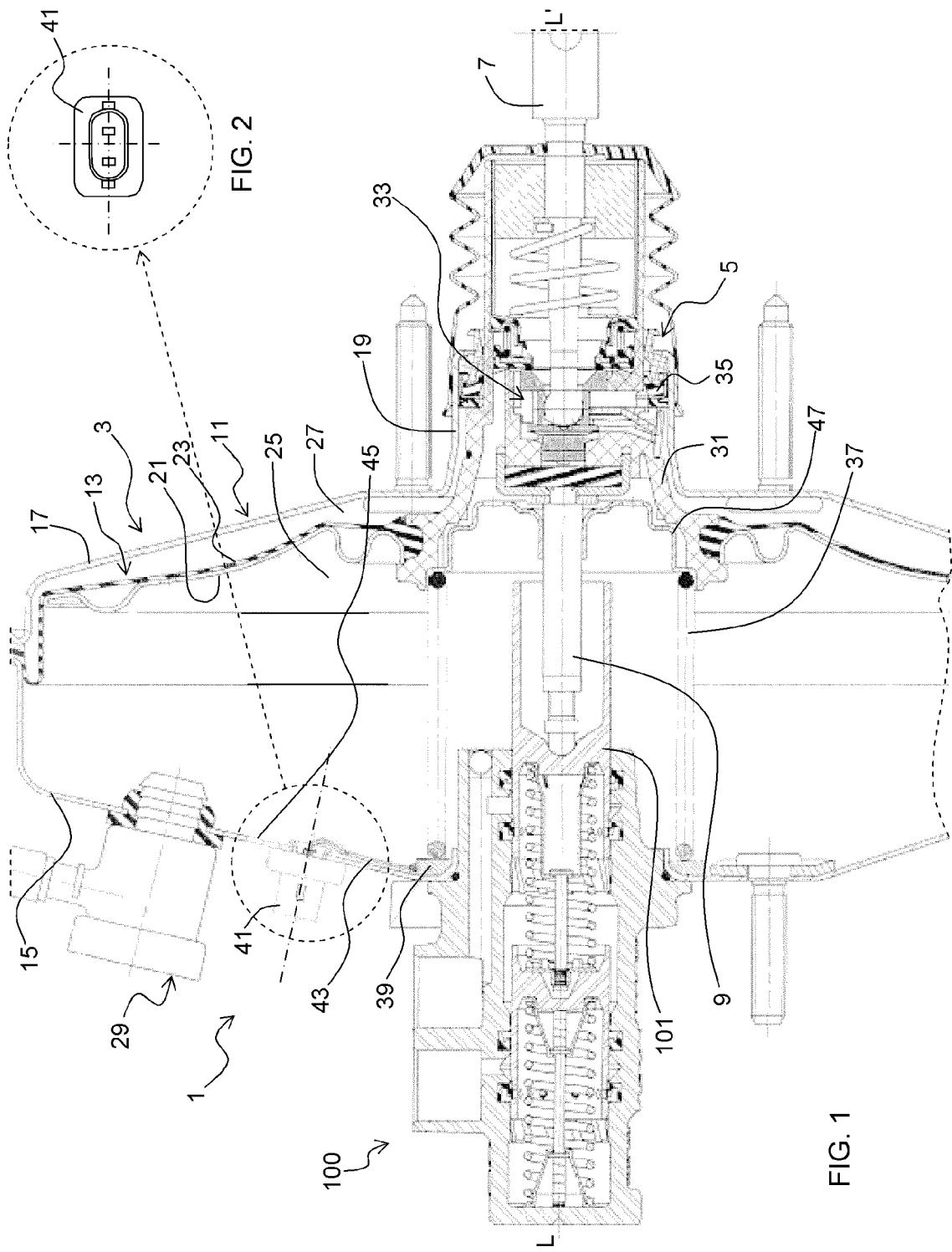

PNEUMATIC BRAKE BOOSTER COMPRISING A FORCE SENSOR

BACKGROUND OF THE INVENTION

The invention relates to hydraulic braking systems comprising a brake booster. More precisely, the invention relates to a pneumatic brake booster.

The invention applies in particular to the motor industry, and more particularly to the industry of braking systems for motor vehicles.

A hydraulic braking system for a motor vehicle of the known type comprises a brake pedal, a pneumatic brake booster, a master cylinder connected to a brake fluid reservoir, a brake fluid circuit and at least one braking member actuated by the brake fluid. The hydraulic braking system may also comprise a hydraulic block.

The brake pedal actuated by a driver is mechanically coupled to the pneumatic brake booster. The pneumatic brake booster is inserted between the brake pedal and the master cylinder. Its function is to amplify a force applied to the brake pedal and to transmit it to the master cylinder. The master cylinder supplied with brake fluid by the brake fluid reservoir pressurizes the brake fluid in the brake fluid circuit under the action of the pneumatic brake booster. The brake fluid acts on the braking member. When the braking member is of the disc brake type, the brake fluid arrives under pressure in a calliper to push a piston to a brake pad and apply a brake disc.

The hydraulic block is an ancillary device comprising a pump making it possible to inject pressurized brake fluid into the circuit. The hydraulic block may operate independently of an action on the brake pedal by the driver. For example, in wet road conditions, it may be actuated to dry the wet brake discs, which makes it possible to ensure more effective braking when the time comes. It may also act as a supplement to the braking system of the known type described above to enhance braking performance in an emergency (anti-lock braking system ABS or electronic stability programme ESP).

In addition, to determine the braking instructions of the driver, necessary in particular to the coordinated operation of the aforementioned devices, the braking system comprises a plurality of sensors. A first exemplary sensor is a sensor for the lighting of brake lights designed to switch on the brake lights of the vehicle when the brake pedal is pressed. Another exemplary sensor is a travel sensor designed to give an indication of the degree of braking demanded by the driver. When measuring, these sensors interact with moving parts, for example the brake pedal.

The motor vehicle hydraulic braking system of the known type furnished with the aforementioned sensors is complex. This complexity causes added cost to the whole system because of the number of sensors, and their installation during the manufacture of a motor vehicle. In addition, it also causes a risk to the reliability of the braking system because of the interaction of the sensors with moving parts.

SUMMARY OF THE INVENTION

One purpose of the invention is to propose a pneumatic brake booster making it possible to solve at least one of the problems of the prior art. In particular, one object of the invention is to propose a pneumatic brake booster making it possible to determine the braking instructions of the driver in a more integrated manner relative to the systems of the prior art.

According to the invention, a pneumatic brake booster is proposed comprising: a sealed structure comprising a rigid casing forming a funnel furnished with an opening and a movable wall dividing the sealed structure into a low-pressure chamber and a working chamber, a pneumatic piston comprising a boss fixedly attached to the movable wall and mounted so as to slide in the funnel opening, a valve element housed in the boss and a seal positioned between the boss and the funnel, an input rod and an output rod coupled on either side of the pneumatic piston, and a return spring to return the pneumatic piston to a rest position, the return spring being placed in the low-pressure chamber between an internal surface of the rigid casing and the pneumatic piston.

The pneumatic brake booster also comprises a force sensor placed in the low-pressure chamber and subjected to the pressure variations of the return spring.

Advantageously, the force sensor is positioned in the low-pressure chamber so as to form a stop for the return spring.

According to a variant of the invention, the force sensor is positioned between the internal surface of the rigid case and the return spring.

According to another variant of the invention, the force sensor is positioned between the pneumatic piston and the return spring.

According to another aspect of the present invention, an electric connector of the force sensor is attached in a sealed manner to the rigid casing.

The electric connector of the force sensor may be mounted swaged onto the rigid casing.

According to yet another aspect of the present invention, the force sensor is connected to the electric connector of the force sensor via an electric cable extending into the low-pressure chamber.

Advantageously the force sensor may be a sensor of the stress gauge type or a threshold sensor.

The pneumatic brake booster according to the invention makes it possible to determine the braking instructions of the driver via a single sensor. It also makes it possible to measure the travel of the brake pedal.

The incorporation of this sensor into the pneumatic brake booster is carried out simply and economically. The precision and reliability of the sensor are also ensured by the absence of interaction with one or more moving parts.

Finally, the force sensor of the pneumatic brake booster according to the invention advantageously replaces the sensor for switching on the brake lights according to the prior art.

BRIEF DESCRIPTION OF THE DRAWINGS

The present invention is illustrated by non-limiting examples in the appended figures, in which identical reference numbers indicate similar elements:

FIG. 1 is a view in partial section of a pneumatic brake booster according to the invention attached to a tandem master cylinder;

FIG. 2 is a side view of a detail of the pneumatic brake booster of FIG. 1, the detail representing an external electric connector.

DETAILED DESCRIPTION

Figure 3:
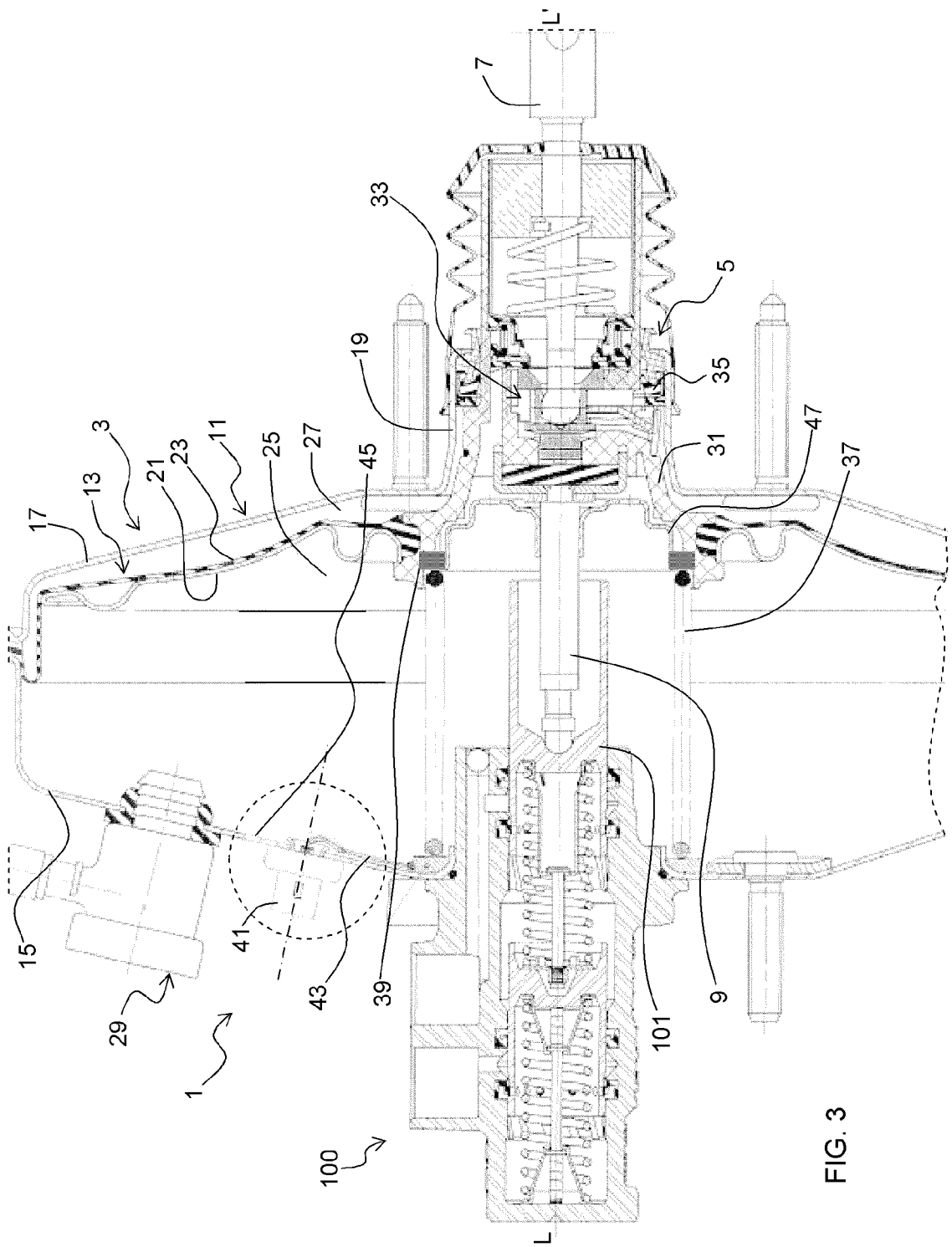

FIG. 1 is a view in section representing a pneumatic brake booster 1 according to the invention. The pneumatic brake booster 1 is inserted between a tandem master cylinder 100 and a brake pedal (not shown).

The pneumatic brake booster 1 comprises a sealed structure 3, a pneumatic piston 5, an input rod 7 and an output rod 9 with a longitudinal axis of revolution LL' and a return spring 37.

The input rod 7 is designed to be coupled to the brake pedal situated on one side of the pneumatic brake booster 1.

The output rod 9 is designed to be coupled to the master cylinder 100 on another side of the pneumatic brake booster 1.

The sealed structure 3 comprises a rigid casing 11 and a movable wall 13. The rigid casing 11 comprises a receptacle 15 furnished with a cover 17 made in the shape of a funnel 19 provided with an opening. The movable wall 13 consists of a skirt 21 and a membrane 23 made of rubber. The movable wall 13 divides the sealed structure into a low-pressure chamber 25 and a working chamber 27. The movable wall 13 is capable of sliding in a sealed manner along the longitudinal axis LL' under the action of a pressure difference between the two chambers 25, 27. The rigid casing 11 is furnished with a sealed pneumatic connector 29 connected to a negative pressure zone of the engine and to a pneumatic pump (not shown).

The pneumatic piston 5 comprises a boss 31 and a valve element 33. The boss 31 is fixedly attached to the movable wall 13 and mounted so as to slide in the opening of the funnel. A seal 35 is positioned between the boss 31 and the funnel 19. The boss 31 is coupled on one side to the input rod 7 and on another side to the output rod 9. The valve element 33 is housed in the boss 31 and controls communication between the low-pressure chamber 25 and the working chamber 27. The valve element 33 is actuated by the input rod 7 connected to the brake pedal. Advantageously, the valve element 33 is a three-way valve whose known operation and structure will not be explained in greater detail.

The return spring 37 is mounted in compression in the low-pressure chamber 25. Advantageously, the return spring 37 is linear and its stiffness is fairly weak. The operation of the pneumatic brake booster according to the invention will now be described.

The function of the pneumatic brake booster is to amplify a force applied by the driver to the brake pedal to transmit it to the master cylinder.

In a rest position, that is to say when no force is exerted on the brake pedal, the pneumatic piston 5 places the low-pressure chamber 25 in communication with the working chamber 27.

In a working position, that is to say during braking, the driver exerts a force on the brake pedal which has the effect of actuating the input rod 7. The input rod 7 actuates the valve element 33 of the pneumatic piston 5 which has the effect: on the one hand, of closing communication between the low-pressure chamber 25 and the working chamber 27, and on the other hand, of placing the working chamber 27 in communication with the outside of the pneumatic brake booster where atmospheric pressure exists.

Under the action of the pressure difference between the two chambers, the movable wall 13 and the pneumatic piston 5 move along the longitudinal axis LL' in the direction of the master cylinder 100. The pneumatic piston 5 then actuates the output rod 9 which transmits an amplified braking force to the primary piston 101 of the master cylinder 100. The return spring 37 makes it possible to return the pneumatic piston 5 and therefore the movable wall 13 to the rest position to prevent braking pressure being applied without pressure on the brake pedal by the driver.

The pneumatic brake booster 1 comprises a force sensor 39. The force sensor 39 is a sensor of known type that is able to measure a force from 0 to 50 decanewtons. It is placed in the low-pressure chamber 25 and forms a stop for the return spring 37. Consequently, it is subjected to the pressure variations of the return spring 37, which depend on the travel of the brake pedal.

According to a first variant (shown in FIG. 1), the force sensor 39 is positioned between the internal surface 45 of the rigid casing and the return spring 37.

According to a second variant (not shown), the force sensor 39 is positioned between the pneumatic piston 5 and the return spring 37. More precisely, the force sensor 39 is positioned between a part 47 having a double "U" section interacting with the output rod 9 and with a rear portion of the pneumatic piston 5.

Advantageously, the force sensor 39 may be a sensor of the stress gauge type. Advantageously, the output signal from the force sensor 39 is proportional to the force applied. As an alternative, the force sensor 39 may be a threshold sensor. Advantageously, the threshold value is slightly greater than the pressure of the return spring 37 at rest.

The force sensor 39 is connected to an electric connector 41 via an electric cable 43 extending into the low-pressure chamber 25. The electric connector 41 of the force sensor 39 is attached in a sealed manner to the rigid casing 11. For example, the electric connector 41 of the force sensor 39 is mounted swaged onto the rigid casing 11.

FIG. 2 represents a front view of the portion of the electric connector 41 that is outside the rigid casing 11. The electric connector 41 is designed to receive a plug of an electric cable connected to an electronic braking system control device, for example a computer (not shown). The electric connector 41 satisfies the electric connection standards in use in the automobile industry.

Since the return spring 37 is linear, its stiffness fairly weak, and since the pressure in place is well determined, there is a linear relation between the travel of the brake pedal and the force applied on the force sensor 39. Consequently, the computer can determine the value of the travel on the basis of the force measurement made by the force sensor 39.

The computer may also use the signal originating from the sensor such as a signal indicating a pressure on the brake pedal by the driver. Consequently, the computer may command the brake lights to switch on.

Advantageously, the computer initiates a self-calibrating system when the vehicle starts up and the low-pressure chamber is placed in negative pressure. The self-calibrating procedure makes it possible to dispense with the disparity in the stiffness of the spring and the existing pressure of one pneumatic brake booster to another due to manufacture. It also makes it possible to dispense with possible weaknesses in the seal of the low-pressure chamber.

The figures and their descriptions made above illustrate the invention rather than limit it.

In particular, the invention has just been described with reference to a particular exemplary electric connector and attachment of the electric connector. Nevertheless, it is evident to those skilled in the art that the invention may be extended to other types of electric connector and attachment when the seal of the low-pressure chamber is satisfactorily assured.

The positioning of the low-pressure chamber and of the working chamber relative to the master cylinder and to the brake pedal is not limiting. Specifically, the chambers could be positioned in an inverted manner without affecting the principle of the invention.

The reference numbers in the claims are non-limiting. The verb "to comprise" does not exclude the presence of elements other than those listed in the claims. The word "a" preceding an element does not exclude the presence of a plurality of such elements.

The invention claimed is:

1. Pneumatic brake booster (1) comprising: a sealed structure (3) comprising a rigid casing (11) forming a funnel (19) furnished with an opening and a movable wall (13) dividing the sealed structure (3) into a low-pressure chamber (25) and a working chamber (27), a pneumatic piston (5) comprising a boss (31) fixedly attached to the movable wall (13) and mounted so as to slide in the funnel opening, a valve element (33) housed in the boss (31) and a seal (35) positioned between the boss (31) and the funnel (19), an input rod (7) and an output rod (9) coupled on either side of the pneumatic piston (5), and a return spring (37) to return the pneumatic piston (5) to a rest position, the return spring (37) being placed in the low-pressure chamber (25) between an internal surface (45) of the rigid casing and the pneumatic piston (5), characterized in that the pneumatic brake booster (1) also comprises a force sensor (39) placed in the low-pressure chamber (25) and subjected to the pressure variations of the return spring (37).

2. Pneumatic brake booster according to claim 1, in which the force sensor (39) is positioned in the low-pressure chamber (25) so as to form a stop for the return spring (37).

3. Pneumatic brake booster according to claim 2, in which the force sensor (39) is positioned between the internal surface (45) of the rigid casing (11) and the return spring (37).

4. Pneumatic brake booster according to claim 3, in which an electric connector (41) of the force sensor (39) is attached in a sealed manner to the rigid casing (11).

5. Pneumatic brake booster according to claim 2, in which the force sensor (39) is positioned between the pneumatic piston (5) and the return spring (37).

6. Pneumatic brake booster according to claim 5, in which an electric connector (41) of the force sensor (39) is attached in a sealed manner to the rigid casing (11).

7. Pneumatic brake booster according to claim 6, in which the electric connector (41) of the force sensor (39) is mounted swaged onto the rigid casing (11).

8. Pneumatic brake booster according to claim 7, in which the force sensor (39) is connected to the electric connector (41) of the force sensor (39) via an electric cable (43) extending into the low-pressure chamber (25).

9. Pneumatic brake booster according to claim 8, in which the force sensor (39) is a sensor of the pressure gauge type, or a threshold sensor.

10. Pneumatic brake booster according to claim 2, in which an electric connector (41) of the force sensor (39) is attached in a sealed manner to the rigid casing (11).

11. Pneumatic brake booster according to claim 1, in which an electric connector (41) of the force sensor (39) is attached in a sealed manner to the rigid casing (11).

12. Pneumatic brake booster according to claim 11, in which the electric connector (41) of the force sensor (39) is mounted swaged onto the rigid casing (11).

13. Pneumatic brake booster according to claim 12, in which the force sensor (39) is connected to the electric connector (41) of the force sensor (39) via an electric cable (43) extending into the low-pressure chamber (25).

14. Pneumatic brake booster according to claim 11, in which the force sensor (39) is connected to the electric connector (41) of the force sensor (39) via an electric cable (43) extending into the low-pressure chamber (25).

15. Pneumatic brake booster according to claim 1, in which the force sensor (39) is a sensor of the pressure gauge type, or a threshold sensor.

\* \* \* \* \*